United States Patent
Liu et al.

(10) Patent No.: US 9,592,714 B2
(45) Date of Patent: Mar. 14, 2017

(54) VEHICLE CONTROL DEVICE

(75) Inventors: Yanqing Liu, Susono (JP); Jin Hozumi, Nagaizumi-cho (JP); Masaaki Tabata, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 13/819,515

(22) PCT Filed: Sep. 3, 2010

(86) PCT No.: PCT/JP2010/065182
§ 371 (c)(1),
(2), (4) Date: Feb. 27, 2013

(87) PCT Pub. No.: WO2012/029184
PCT Pub. Date: Mar. 8, 2012

(65) Prior Publication Data
US 2013/0166149 A1    Jun. 27, 2013

(51) Int. Cl.
*B60G 17/018*    (2006.01)
*B60G 23/00*    (2006.01)
(Continued)

(52) U.S. Cl.
CPC ......... *B60G 17/015* (2013.01); *B60G 17/016* (2013.01); *B60G 17/018* (2013.01);
(Continued)

(58) Field of Classification Search
CPC ......... B60G 15/00; B60G 15/02; B60G 17/00
(Continued)

(56) References Cited

U.S. PATENT DOCUMENTS 4,277,076 A * 7/1981 Hanna ............... B60G 17/01925
                                            280/124.159
4,598,929 A * 7/1986 Kumagai et al. .......... 280/5.513
(Continued)

FOREIGN PATENT DOCUMENTS

DE    41 33 666 A1    4/1993
DE    199 43 112 A1    5/2000
(Continued)

OTHER PUBLICATIONS http://www.ijtte.com/uploads/2011-12-19/d4c8811d-2f84-d9fa231-244.pdf The Effect of Stiffness and Damping of the Suspension System Elements on the Optimisation of the Vibrational Behaviour of a Bus Dragan Sekulić and Vlastimir Dedović, May 16, 2011.*
(Continued)

*Primary Examiner* — Adam Tissot
*Assistant Examiner* — Tommy Worden
(74) *Attorney, Agent, or Firm* — Oblon, McClelland, Maier & Neustadt, L.L.P.

(57) ABSTRACT

A vehicle control device includes a spring mechanism configured to connect a sprung member and an unsprung member of a vehicle, generate a spring force according to a relative displacement between the sprung member and the unsprung member, and be able to variably control the spring force, and a damping mechanism configured to connect the sprung member and the unsprung member, generate a damping force for damping a relative motion between the sprung member and the unsprung member, and be able to variably control the damping force, wherein the spring mechanism and the damping mechanism are controlled based on a first physical quantity relating to a sprung vibration of the vehicle and a second physical quantity relating to an unsprung vibration of the vehicle.

14 Claims, 8 Drawing Sheets

(51) Int. Cl.

| | | |
|---|---|---|
| *B62C 3/00* | (2006.01) | |
| *B62K 25/00* | (2006.01) | |
| *G06F 7/00* | (2006.01) | |
| *G06F 17/00* | (2006.01) | |
| *G06F 19/00* | (2011.01) | |
| *B60G 17/015* | (2006.01) | |
| *B60G 17/016* | (2006.01) | |
| *B60G 17/02* | (2006.01) | |

(52) U.S. Cl.
CPC .......... *B60G 17/02* (2013.01); *B60G 2400/91* (2013.01); *B60G 2500/20* (2013.01)

(58) Field of Classification Search
USPC ........... 701/38; 280/5.5, 5.505, 5.507, 5.512, 280/5.515, 124.104, 124.1
See application file for complete search history.

(56) References Cited

U.S. PATENT DOCUMENTS

| | | | | |
|---|---|---|---|---|
| 5,124,917 | A * | 6/1992 | Kanamori | 701/37 |
| 5,332,061 | A * | 7/1994 | Majeed | B60K 5/1283 180/312 |
| 5,444,621 | A * | 8/1995 | Matsunaga | B60G 17/0165 280/5.518 |
| 5,446,662 | A * | 8/1995 | Kojima et al. | 701/38 |
| 5,572,426 | A * | 11/1996 | Sasaki | B60G 17/0152 280/5.515 |
| 5,598,337 | A * | 1/1997 | Butsuen | B60G 13/16 180/312 |
| 5,697,634 | A * | 12/1997 | Kamimae et al. | 280/124.108 |
| 5,911,768 | A * | 6/1999 | Sasaki | B60G 17/0162 701/37 |
| 5,944,763 | A * | 8/1999 | Iwasaki | B60G 17/0162 280/5.5 |
| 6,259,982 | B1 * | 7/2001 | Williams et al. | 701/38 |
| 6,266,602 | B1 * | 7/2001 | Yamaura | B60T 8/172 303/112 |
| 6,314,353 | B1 | 11/2001 | Ohsaku et al. | |
| 6,434,460 | B1 * | 8/2002 | Uchino | B60G 17/01933 180/902 |
| 7,085,636 | B2 * | 8/2006 | Song et al. | 701/38 |
| 7,333,882 | B2 * | 2/2008 | Uchino | B60G 17/016 267/136 |
| 7,634,323 | B2 * | 12/2009 | Vermillion et al. | 700/29 |
| 2002/0032508 | A1 * | 3/2002 | Uchino | B60G 17/01933 701/37 |
| 2005/0178628 | A1 * | 8/2005 | Uchino | B60G 17/016 188/379 |
| 2006/0287791 | A1 * | 12/2006 | Boon et al. | 701/38 |
| 2010/0013174 | A1 * | 1/2010 | Buma | B60G 17/0157 280/5.507 |
| 2011/0025001 | A1 | 2/2011 | Kajino | |
| 2014/0353934 | A1 * | 12/2014 | Yabumoto | B60G 17/00 280/5.515 |
| 2016/0152107 | A1 * | 6/2016 | Ranjan | B60G 15/065 267/225 |

FOREIGN PATENT DOCUMENTS

| | | |
|---|---|---|
| JP | 5-26570 U | 4/1993 |
| JP | 5 201226 | 8/1993 |
| JP | 7 266830 | 10/1995 |
| JP | 10-26170 A | 1/1998 |
| JP | 2000 148208 | 5/2000 |
| JP | 2009 202622 | 9/2009 |
| JP | 2009 241726 | 10/2009 |
| JP | 2010 6343 | 1/2010 |

OTHER PUBLICATIONS

International Search Report Issued Sep. 28, 2010 in PCT/JP10/65182 Filed Sep. 3, 2010.

* cited by examiner

VEHICLE CONTROL DEVICE

FIELD

The present invention relates to a vehicle control device.

BACKGROUND

Conventionally, there is proposed a technology for executing vibration damping control of a vehicle. Patent Literature 1 discloses a technology for controlling a damping force of a damper by calculating a target damping force by a state amount composed of a speed of a sprung member, a relative displacement amount of the sprung member to an unsprung member, and the like.

CITATION LIST

Patent Literature

Patent Literature 1: Japanese Patent Application Laid-open No. 2000-148208

SUMMARY

Technical Problem

In vibration damping control of a vehicle, conventionally, it is not sufficiently examined to suppress a vibration of a sprung member and to suppress a vibration of an unsprung member at the same time. When, for example, a damping force of a suspension device is controlled based on the vibration of a sprung member, there is a case that a vibration of an unsprung member is increased.

An object of the present invention is to provide a vehicle control device capable of suppressing a vibration of a sprung member and suppressing a vibration of an unsprung member at the same time.

Solution to Problem

In order to achieve the above mentioned object, a vehicle control device according to the present invention includes a spring mechanism configured to connect a sprung member and an unsprung member of a vehicle, generate a spring force according to a relative displacement between the sprung member and the unsprung member, and be able to variably control the spring force; and a damping mechanism configured to connect the sprung member and the unsprung member, generate a damping force for damping a relative motion between the sprung member and the unsprung member, and be able to variably control the damping force, wherein the spring mechanism and the damping mechanism are controlled based on a first physical quantity relating to a sprung vibration of the vehicle and a second physical quantity relating to an unsprung vibration of the vehicle as well as one of the spring mechanism and the damping mechanism is controlled based on the vibration characteristics of the sprung member and the other thereof is controlled based on the vibration characteristics of the unsprung member.

In the vehicle control device, it is preferable that the spring mechanism and the damping mechanism are controlled based on the frequency of the sprung vibration and a frequency of the unsprung vibration.

In the vehicle control device, it is preferable that the second physical quantity is a vertical load variation amount of a wheel of the vehicle, and the vertical load variation amount is calculated based on the sprung acceleration and the unsprung acceleration of the vehicle.

In the vehicle control device, it is preferable that the spring mechanism is controlled so as to suppress a low frequency vibration generated to the vehicle.

In the vehicle control device, it is preferable that the damping mechanism is controlled so as to suppress a high frequency vibration generated to the vehicle.

In the vehicle control device, it is preferable that the spring mechanism and the damping mechanism are controlled by giving a weight according to a frequency to the spring mechanism and the damping mechanism, respectively based on the first physical quantity and the second physical quantity.

In the vehicle control device, it is preferable that target values of the spring force and the damping force are determined by applying an H∞ control theory to a motion model of the vehicle including the spring mechanism and the damping mechanism.

In the vehicle control device, it is preferable that target values of the spring force and the damping force are determined using a displacement speed on a road surface in a vertical direction as a disturbance input to the motion model.

In order to achieve the above mentioned object, a vehicle control device according to the present invention includes a spring mechanism configured to connect a sprung member and an unsprung member of a vehicle, generate a spring force according to a relative displacement between the sprung member and the unsprung member, and be able to variably control the spring force; and a damping mechanism configured to connect the sprung member and the unsprung member, generate a damping force for damping a relative motion between the sprung member and the unsprung member, and be able to variably control the damping force, wherein the spring mechanism and the damping mechanism are controlled in cooperation based on the sprung vibration of the vehicle and the unsprung vibration of the vehicle as well as one of the spring mechanism and the damping mechanism is controlled based on the vibration characteristics of the sprung member and the other thereof is controlled based on the vibration characteristics of the unsprung member.

In order to achieve the above mentioned object, a vehicle control device according to the present invention includes a spring mechanism configured to connect a sprung member and an unsprung member of a vehicle, generate a spring force according to a relative displacement between the sprung member and the unsprung member, and be able to variably control the spring force; and a damping mechanism configured to connect the sprung member and the unsprung member, generate a damping force for damping a relative motion between the sprung member and the unsprung member, and be able to variably control the damping force, wherein one of the spring mechanism and the damping mechanism is controlled based on the vibration characteristics of the sprung member and the other thereof is controlled based on the vibration characteristics of the unsprung member by applying an H∞ control theory to a motion model of the vehicle including the spring mechanism and the damping mechanism.

Advantageous Effects of Invention

The vehicle control device according to the present invention controls one of a spring mechanism and a damping mechanism based on vibration characteristics of a sprung member and the other thereof based on vibration characteristics of an unsprung member. Thus, according to the vehicle control device of the present invention, there is achieved an effect for suppressing a vibration of the sprung member and a vibration of the unsprung member at the same time.

DESCRIPTION OF EMBODIMENTS

A vehicle control device according to an embodiment of the present invention will be explained below in detail referring to drawings. Note that the present invention is by no means restricted by the embodiment. Further, the components in the embodiment include components that can be easily conceived by a person skilled in the art or substantially the same components.

Embodiment

Figure 1:
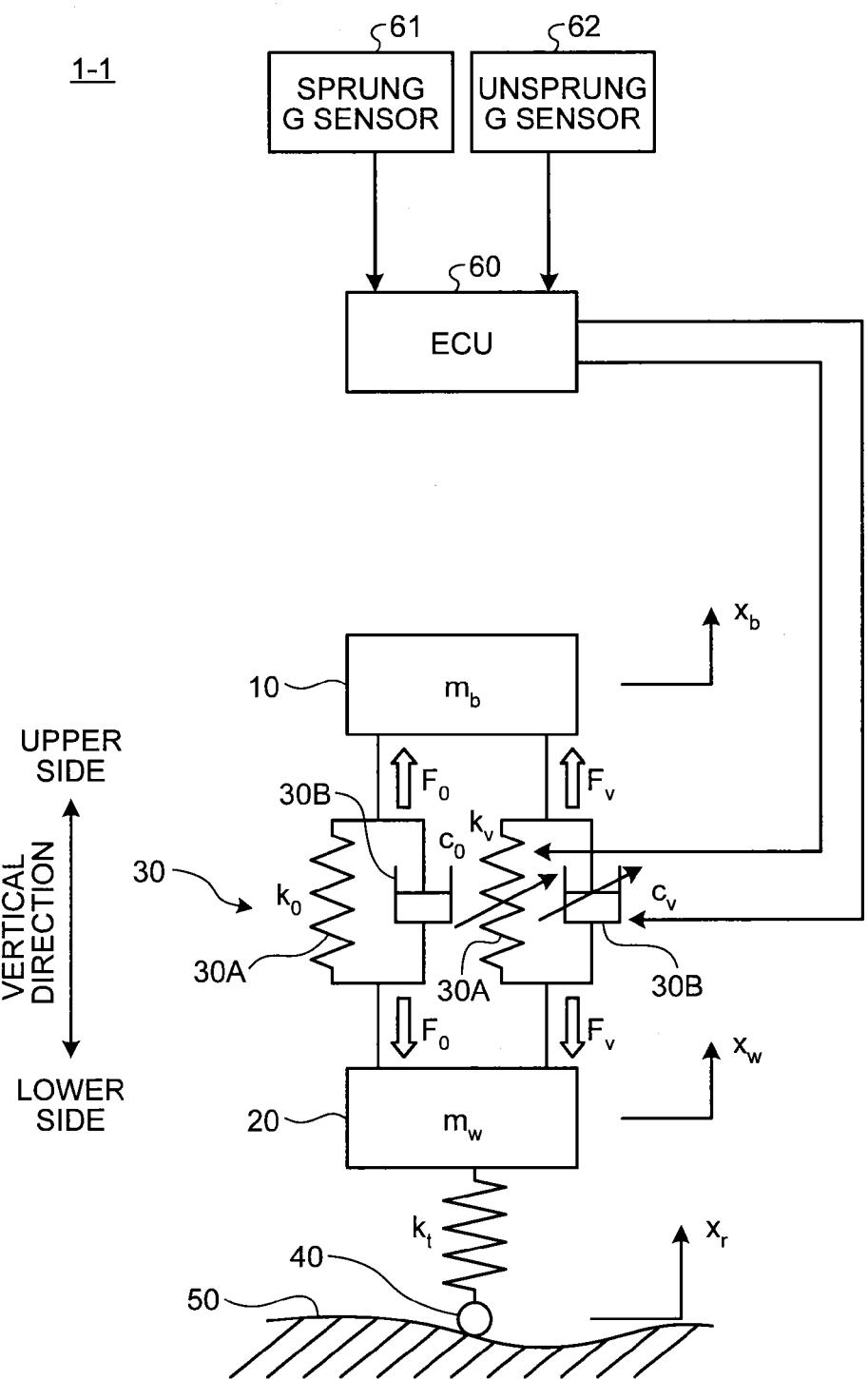
FIG. 1 is a view illustrating a single wheel model of a vibration damping control system according to an embodiment.

An embodiment will be explained referring to FIG. 1 to FIG. 12. The embodiment relates to a vehicle control device. FIG. 1 is a view illustrating a single wheel model of a vibration damping control system according to the embodiment.

A vehicle control device 1-1 of the embodiment controls a spring mechanism and a damping mechanism based on the sprung vibration and the unsprung vibration of a vehicle, respectively. Target values of a spring force and a damping force are determined based on an H∞control theory. In the H∞ control logic, a simultaneous control logic is designed using sprung characteristics (acceleration, speed, displacement) and an unsprung vertical load variation amount as evaluation outputs. A target value of a variable spring force is calculated by a control logic paying attention to a low frequency response of the sprung characteristics. Further, a target value of a variable damping force is calculated by a control logic paying attention to a high frequency response of the unsprung vertical load variation amount. In the design of the control logic, filters corresponding to a low frequency and a high frequency are designed, respectively based on the sprung characteristics and the transfer function of the vertical load variation.

According to the vehicle control device 1-1 of the embodiment, a feeling while riding and a road-holding property (drivability) can be improved at the same time by controlling the sprung vibration relating to a feeling while riding performance and the vertical load variation relating to the road-holding property at the same time.

The single wheel model illustrated in FIG. 1 is a motion model of a vehicle including both the spring mechanism and the damping mechanism. As illustrated in FIG. 1, a suspension device 30 is interposed between a sprung member 10 and an unsprung member 20 of the vehicle. The sprung member 10 is a member supported by the suspension device 30 and includes a vehicle body. The unsprung member 20 is a member disposed nearer to a wheel 40 side than the suspension device 30 and includes a knuckle coupled with the wheel 40, a lower arm coupled with the knuckle, and the like.

The suspension device 30 has a spring mechanism 30A and a damping mechanism 30B. The spring mechanism 30A and the damping mechanism 30B are disposed in parallel. The spring mechanism 30A connects the sprung member 10 and the unsprung member 20, generates the spring force according to a relative displacement between the sprung member 10 and the unsprung member 20, and applies the spring force on the sprung member 10 and the unsprung member 20. Further, the spring mechanism 30A can variably control a spring coefficient k, that is, the spring force. The relative displacement between the sprung member 10 and the unsprung member 20 is a relative displacement in a direction where the sprung member 10 approaches or is away from the unsprung member 20 in a stroke direction of the suspension device 30.

The spring coefficient k of the spring mechanism 30A includes a linear spring coefficient $k_0$ and a nonlinear spring coefficient $k_v$. The linear spring coefficient $k_0$ is a spring coefficient in which the relative displacement between the sprung member 10 and the unsprung member 20 linearly corresponds to the spring force. The nonlinear spring coefficient $k_v$ is a variably controlled spring coefficient and nonlinearly changes the spring force to the relative displacement between the sprung member 10 and the unsprung member 20. That is, a spring force generated by the spring mechanism 30A can be increased and decreased to a predetermined relative displacement by adding a spring force according to the nonlinear spring coefficient $k_v$ to a spring force according to the linear spring coefficient $k_0$.

The damping mechanism 30B connects the sprung member 10 and the unsprung member 20 and generates the damping force for damping a relative motion between the sprung member 10 and the unsprung member 20. The damping mechanism 30B can variably control a damping coefficient c, that is, the damping force. The relative displacement between the sprung member 10 and the unsprung member 20 is the relative displacement in a direction where the sprung member 10 approaches or is away from the unsprung member 20 in the stroke direction of the suspension device 30. The damping mechanism 30B damps the relative motion by generating the damping force according to a relative speed between the sprung member 10 and the unsprung member 20 in the relative motion.

The damping coefficient c of the damping mechanism 30B includes a linear damping coefficient $c_0$ and a nonlinear damping coefficient $c_v$. The linear damping coefficient $c_0$ is a damping coefficient in which the relative speed between the sprung member 10 and the unsprung member 20 linearly corresponds to the damping force. The nonlinear damping coefficient $c_v$ is a variably controlled damping coefficient and nonlinearly changes the damping force to the relative speed between the sprung member 10 and the unsprung member 20. That is, the damping force generated by the damping mechanism 30B can be increased and decreased to a predetermined relative speed by adding a damping force according to the nonlinear damping coefficient $c_v$ to a damping force according to the linear damping coefficient $c_0$.

Used as the spring mechanism 30A is, for example, an air suspension mechanism capable of variably controlling a spring coefficient. The air suspension mechanism has an air chamber interposed, between, for example, the sprung member 10 and the unsprung member 20, and the air chamber acts as a spring. The air chamber is supplied with compressed air from a compressor via an air pipe. As a means for variably controlling the spring coefficient, for example, an actuator can be employed that variably controls a flow path area of the air pipe connecting the air chamber of the air suspension mechanism to the compressor. Note that the spring mechanism 30A is not restricted to the mechanism described above and other spring mechanism capable of variably controlling the spring coefficient may be employed.

Used as the damping mechanism 30B is, for example, a shock absorber mechanism capable of variably controlling a damping coefficient. The shock absorber mechanism includes, for example, a cylinder which is connected to one of the sprung member 10 or the unsprung member 20 and in which a differential fluid is enclosed and a piston rod which is connected to the other of the sprung member 10 or the unsprung member 20, has a piston portion, and reciprocates in the cylinder. As a means for variably controlling the damping coefficient, for example, an actuator may be employed that varies a flow path area of an oil path for communicating a piston upper chamber with a piston lower chamber by rotating a rotary valve of the piston portion. Note that the damping mechanism 30B is not restricted to the mechanism described above and other damping mechanism capable of variably controlling the damping coefficient may be used. In the suspension device 30 of the embodiment, control responsiveness of the damping coefficient in the damping mechanism 30B is higher than control responsiveness of the spring coefficient in the spring mechanism 30A.

In FIG. 1, $F_0$ is a generation force (generation force without control) of the suspension device 30 corresponding to the linear spring coefficient $k_0$ and the linear damping coefficient $c_0$. The generation force without control $F_0$ is set as, for example, an intermediate constant in a control range of the spring force and the damping force. Further, $F_v$ is a generation force (generation force with control) of the suspension device 30 corresponding to the nonlinear spring constant $k_v$ and the nonlinear damping coefficient $c_v$. The generation force with control $F_v$ is a generation force by a variable constant design.

The vehicle is disposed with an ECU 60, a sprung G sensor 61, and an unsprung G sensor 62. The ECU 60 is, for example, an electronic control unit having a computer. The ECU 60 can function as a control unit for controlling the vehicle. The sprung G sensor 61 is disposed to the sprung member 10. The sprung G sensor 61 can detect acceleration in an up-down direction of the sprung member 10. The unsprung G sensor 62 is disposed to the unsprung member 20. The unsprung G sensor 62 can detect acceleration in an up-down direction of the unsprung member 20. The sprung G sensor 61 and the unsprung G sensor 62 are connected to the ECU 60, and a signal showing results of detection of the sprung G sensor 61 and the unsprung G sensor 62 are output to the ECU 60, respectively.

The ECU 60 is connected to an actuator of the spring mechanism 30A and can control the actuator of the spring mechanism 30A. Further, the ECU 60 is connected to an actuator of the damping mechanism 30B and can control the actuator of the damping mechanism 30B. The vehicle control device 1-1 of the embodiment includes the spring mechanism 30A, the damping mechanism 30B, and the ECU 60.

A motion equation of the single wheel model illustrated in FIG. 1 is shown by Expression (1) and Expression (2) described below.

$$m_b x_b'' = k_0(x_w - x_b) + c_0(x_w' - x_b') + k_v(x_w - x_b) + c_v(x_w' - x_b') \quad (1)$$

$$m_w x_w'' = -k_0(x_w - x_b) - c_0(x_w' - x_b') - x_b) - c_v(x_w' - x_b') + k_t(x_r - x_w) \quad (2)$$

where, $x_r$, $x_w$, and $x_b$ show a displacement of a road surface 50, a displacement of the unsprung member 20, and a displacement of the sprung member 10, respectively. Here, the displacement is a displacement in a vehicle up-down direction with respect to respective reference positions and can be set as a displacement in, for example, a vertical direction. Note that a moving amount of the suspension device 30 in an axis direction may be used as the displacement. In the following explanation, the displacement $x_r$ of the road surface 50 is simply described as "road surface displacement $x_r$", the displacement $x_b$ of the sprung member 10 is simply described as "sprung displacement $x_b$", and the displacement $x_w$ of the unsprung member 20 is simply described as "unsprung displacement $x_w$". $m_b$ shows a mass of the sprung member 10 (hereinafter, simply described as "sprung mass $m_b$"), and $m_w$ shows a mass of the unsprung member 20 (hereinafter, simply described as "unsprung mass $m_w$"), respectively. $k_t$ shows rigidity (spring constant) of the wheel 40. Further, a symbol "'" in Expressions and the like shows once differentiation and a symbol "''" shows twice differentiation.

Further, when the single wheel model is shown by a state space representation, the single wheel model is shown by Expression (3) and Expression (4) described below.

$$x_p' = A_p x_p + B_{p1} w_1 + B_{p2} u \quad (3)$$

$$z_p = C_{p1} + D_{p11} w_1 + D_{p12} u \quad (4)$$

where, $A_p$ is as shown in [Expression 1] described below, $B_{p1}$ is as shown in [Expression 2] described below, $B_{p2}$ is as shown in [Expression 3] described below, $x_p$ is as shown in [Expression 4] described below, $C_{p1}$ is as shown in [Expression 5] described below, $D_{p11}$ is as shown in [Expression 6] described below, $D_{p12}$ is as shown in [Expression 7] described below, a control input u is as shown in [Expression 8] described below, and an evaluation output $z_p$ is as shown in [Expression 9] described below. Further, a disturbance input $w_1 = x_r'$ (a displacement speed of the road surface 50). Note that a first row of a matrix of [Expression 9] described below is sprung G, and a second row is the vertical load variation amount. The sprung G is acceleration in the up-down direction of the sprung member 10. The vertical load variation amount is a variation amount to a predetermined vertical load in a predetermined state in a vertical load of the wheel 40. A vertical load when the vehicle stops on, for example, a flat road surface can be used as the predetermined state. The vertical load variation amount shows an unsprung road-holding property.

When a control system is designed using the unsprung vertical load variation amount as an evaluation output, it is difficult to measure the vertical load variation amount by an actual vehicle. Although it is considered to execute a direct measurement using a vertical load variation sensor as a means for measuring the vertical load variation amount, a problem arises in an increase of cost. In the embodiment, as explained below, the vertical load variation amount is calculated based on sprung acceleration (described also as "sprung G") and unsprung acceleration (described also as "unsprung G"). With the operation, the vertical load variation amount can be obtained while suppressing the increase of cost, thereby a control accuracy can be improved. The vertical load variation amount $F_t$ can be shown by Expression (5) described below which is derived from Expression (1) and Expression (2).

$$F_t = k_t(x_r - x_w) = m_b x_b'' + m_w x_w'' \tag{5}$$

That is, a theoretical value of the vertical load variation amount $F_t$ can be calculated based on a known sprung mass $m_b$ and unsprung mass $m_w$, the sprung acceleration $x_b''$, and the unsprung acceleration $x_w''$. With the operation, the vertical load variation amount $F_t$ can be calculated indirectly as well as accurately without using the direct measurement means such as the vertical load variation sensor and the like. Note that, when the unsprung G sensor 62 is not used, it is also possible to calculate the vertical load variation amount $F_t$ by an observer design based on the sprung acceleration $x_b''$ and a stroke displacement of the suspension device 30.

$$A_p = \begin{pmatrix} 0 & 0 & -1 & 0 \\ 0 & 0 & 1 & -1 \\ \frac{k_t}{m_w} & -\frac{k_0}{m_w} & -\frac{c_0}{m_w} & \frac{c_0}{m_w} \\ 0 & \frac{k_0}{m_b} & \frac{c_0}{m_b} & -\frac{c_0}{m_b} \end{pmatrix} \tag{Expression 1}$$

$$B_{p1} = \begin{pmatrix} 1 \\ 0 \\ 0 \\ 0 \end{pmatrix} \tag{Expression 2}$$

$$B_{p2} = \begin{pmatrix} 0 & 0 \\ 0 & 0 \\ -\frac{x_w' - x_b'}{m_w} & -\frac{x_w - x_b}{m_w} \\ \frac{x_w' - x_b'}{m_b} & \frac{x_w - x_b}{m_b} \end{pmatrix} \tag{Expression 3}$$

$$x_p = \begin{pmatrix} x_r - x_w \\ x_w - x_b \\ x_w' \\ x_b' \end{pmatrix} \tag{Expression 4}$$

$$C_{p1} = \begin{bmatrix} 0 & \frac{k_0}{m_b} & \frac{c_0}{m_b} & -\frac{c_0}{m_b} \\ k_t & 0 & 0 & 0 \end{bmatrix} \tag{Expression 5}$$

$$D_{p11} = \begin{bmatrix} 0 \\ 0 \end{bmatrix} \tag{Expression 6}$$

$$D_{p12} = \begin{bmatrix} \frac{x_w' - x_b'}{m_b} & \frac{x_w - x_b}{m_b} \\ 0 & 0 \end{bmatrix} \tag{Expression 7}$$

-continued $$u = \begin{pmatrix} c_v \\ k_v \end{pmatrix} \tag{Expression 8}$$

$$z_p = \begin{pmatrix} x_b'' \\ m_b x_b'' + m_w x_w'' \end{pmatrix} \tag{Expression 9}$$

It is assumed that the state space representation of a frequency weight $W_s$ (s) applied to the evaluation output $z_p$ is shown by Expression (6) and Expression (7).

$$x_{wt}' = A_w x_{wt} + B_w z_p \tag{6}$$

$$z_w = C_w x_{wt} + D_w z_p \tag{7}$$

wherein, $x_{wt}$ shows a state amount of the frequency weight $W_s$ (s), and $z_w$ shows an output of the frequency weight $W_s(s)$. Further, $A_w$, $B_w$, $C_w$, and $D_w$ are constant matrices determined by a control specification, respectively. As shown in Expression (6) and Expression (7), a weight according to a frequency is given to the sprung acceleration $x_b''$ and the vertical load variation amount $F_t$, respectively. In the embodiment, a weight according to a frequency is given to the spring mechanism 30A and the damping mechanism 30B based on the sprung acceleration $x_b''$ and the vertical load variation amount $F_t$, respectively, thereby the spring mechanism 30A and the damping mechanism 30B are controlled.

At the time, a state space representation of a generalized plant in a nonlinear H∞ state feedback control system is as shown by Expression (8) and Expression (9) described below.

$$x' = Ax + B_1 w + B_2 u \tag{8}$$

$$z = Cx + D_1 w + D_2 u \tag{9}$$

where, x is as shown in [Expression 10] described below, z is as shown in [Expression 11] described below, A is as shown in [Expression 12] described below, $B_1$ is as shown in [Expression 13] described below, $B_2$ is as shown in [Expression 14] described below, C is as shown in [Expression 15] described below, $D_1$ is as shown in [Expression 16] described below, and $D_2$ is as shown in [Expression 17] described below.

$$x = \begin{bmatrix} x_p \\ x_{wt} \end{bmatrix} \tag{Expression 10}$$

$$z = [z_w] \tag{Expression 11}$$

$$A = \begin{bmatrix} A_p & 0 \\ B_w C_p & A_w \end{bmatrix} \tag{Expression 12}$$

$$B_1 = \begin{bmatrix} B_{p1} \\ B_w D_{p11} \end{bmatrix} \tag{Expression 13}$$

$$B_2 = \begin{bmatrix} B_{p2} \\ B_w D_{p12} \end{bmatrix} \tag{Expression 14}$$

$$C = [C_w C_1 \ C_w] \tag{Expression 15}$$

$$D_1 = [D_w D_{p11}] \tag{Expression 16}$$

$$D_2 = [D_w D_{p12}] \tag{Expression 17}$$

From here, a positive definite symmetric solution P can be determined by solving a Riccati equation shown in [Expression 18] described below. A solution of the Riccati equation can be determined using a computer to which known numerical value calculation software, for example, MATLAB (registered trademark) and the like is assembled.

$$PA + A^T P + \frac{1}{\gamma^2} PB_1 B_1^T P + C^T C + e = 0 \quad \text{[Expression 18]}$$

where, γ is a positive number (for example, 1) and e is an infinitesimal positive number (for example, $10^{-6}$I). Note that I shows a unit matrix.

The control input u can be obtained from the thus obtained positive definite symmetric solution P by [Expression 19] described below.

$$u = \begin{pmatrix} c_v \\ k_v \end{pmatrix} = -B_2^T Px \quad \text{[Expression 19]}$$

Here, an example of creating a frequency weight function will be explained. In the state space representation of Expression (6) and Expression (7) described above, a matrix $A_w$ is as shown in [Expression 20] described below, $B_w$ is as shown in [Expression 21] described below, $C_w$ is as shown in [Expression 22] described below, and $D_w$ is as shown in [Expression 23] described below. Note that a matrix W in [Expression 21] and [Expression 22] described above is shown by [Expression 24] described below. Here, $W_b$ is a weight gain of a sprung vibration control, and $W_s$ is a weight gain of a vertical load variation control.

$$A_w = \begin{bmatrix} a_1 & \\ & a_2 \end{bmatrix} \quad \text{[Expression 20]}$$

$$B_w = \begin{bmatrix} b_1 & \\ & b_2 \end{bmatrix} \quad \text{[Expression 21]}$$

$$C_w = \begin{bmatrix} c_1 & \\ & c_2 \end{bmatrix} W \quad \text{[Expression 22]}$$

$$D_w = \begin{bmatrix} d_1 & \\ & d_2 \end{bmatrix} W \quad \text{[Expression 23]}$$

$$W = \begin{bmatrix} W_b & \\ & W_s \end{bmatrix} \quad \text{[Expression 24]}$$

Figure 2:
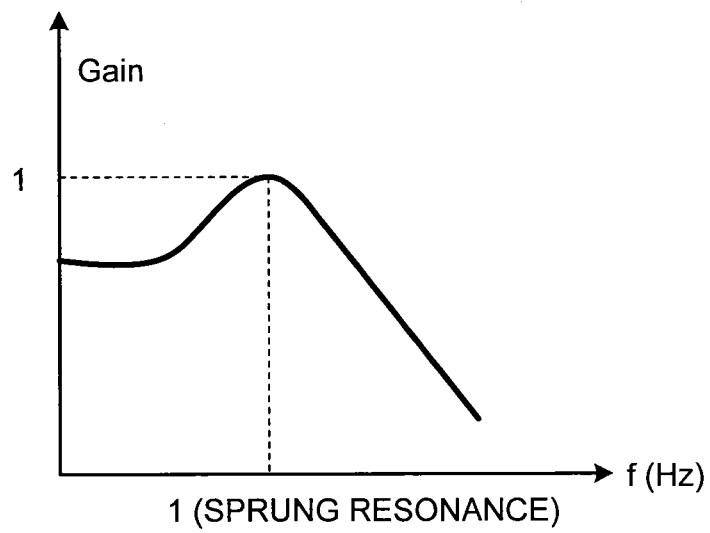
FIG. 2 is a view illustrating a weight function to a sprung G based on a Butterworth filter.
Figure 3:
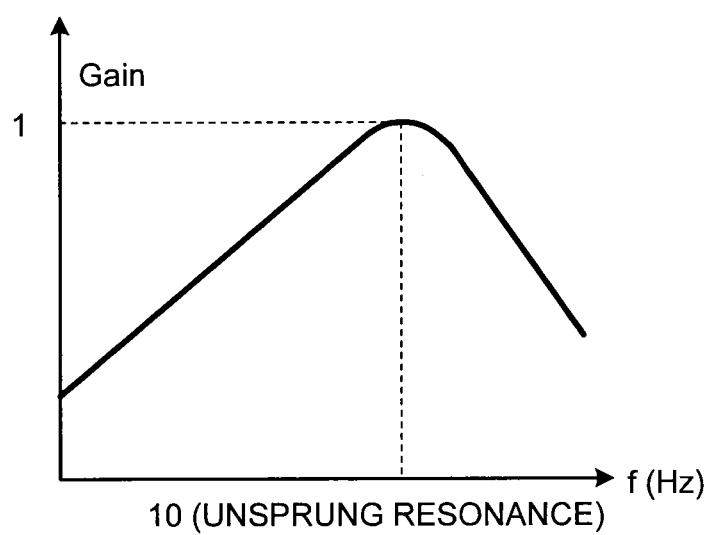
FIG. 3 is a view illustrating a weight function to a vertical load variation based on the Butterworth filter.

Elements of [Expression 20], [Expression 21], [Expression 22], and [Expression 23] described above are designed based on a filter such as a band-pass filter. FIG. 2 is a view illustrating a weight function to the sprung G based on a Butterworth filter, and FIG. 3 is a view illustrating a weight function to the vertical load variation based on the Butterworth filter. In FIG. 2 and FIG. 3, a horizontal axis shows a frequency and a vertical axis shows a gain. The respective elements can be designed by Expression (10) and Expression (11) described below by, for example, a Butterworth filter function {butter ( )} of MATLAB.

$$[a_1 b_1 c_1 d_1] = \text{butter}(n, [Wn\_low1, Wn\_high1]) \quad (10)$$

$$[a_2 b_2 c_2 d_2] = \text{butter}(n, [Wn\_low2, Wn\_high2]) \quad (11)$$

where, n is a degree (for example, 1) of a filter, Wn_low1, Wn_low2, Wn_high1, and Wn_high2 are a cut-off frequency of the filter. Wn_low1 and Wn_high1 are cut-off frequencies of a low frequency side and a high frequency side in a band-pass filter according to the sprung vibration control, respectively. Further, Wn_low2 and Wn_high2 are cut-off frequencies of a low frequency side and a high frequency side in a band-pass filter according to the vertical load variation control, respectively.

A cut-off frequency of a band-pass filter according to the sprung vibration control is determined based on the vibration characteristics of the sprung member 10, for example, based on the resonance frequency of the sprung member 10. The cut-off frequency of the sprung vibration control is determined so that, for example, a large weight is given to the sprung vibration of the resonance frequency of the sprung member 10. As illustrated in, for example, FIG. 2, the weight function to the sprung G is maximized at 1 Hz, and a weight is reduced as the frequency increases on a side where the frequency becomes higher than 1 Hz. Further, on a side where the frequency is lower than 1 Hz, although the weight is reduced as the frequency decreases, the weight becomes approximately constant in a region in which the frequency is equal to or less than a predetermined frequency.

Further, a cut-off frequency of a band-pass filter according to the vertical load variation control is determined based on the vibration characteristics of the unsprung member 20, for example, based on the resonance frequency of the unsprung member 20. A cut-off frequency of the vertical load variation control is determined so that, for example, a large weight is given to the vertical load variation of the resonance frequency of the unsprung member 20. As illustrated in, for example, FIG. 3, the weight function to the vertical load variation is maximized at 10 Hz, and a weight is reduced as the frequency increases on a side where the frequency becomes higher than 10 Hz. Further, the weight is reduced as the frequency decreases on a side where the frequency is lower than 10 Hz.

Figure 4:
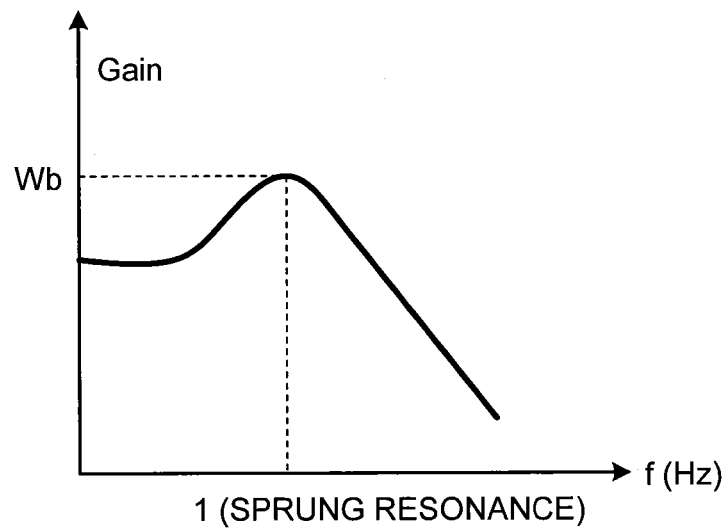
FIG. 4 is a view illustrating a weight function to the sprung G after gain adjustment.
Figure 5:
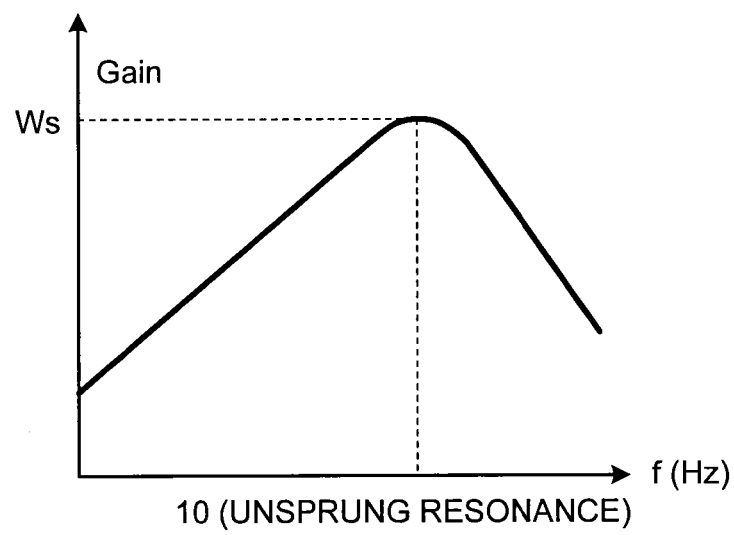
FIG. 5 is a view illustrating a weight function to the vertical load variation after gain adjustment.

The weight functions illustrated in FIG. 2 and FIG. 3 have a maximum value of 1, respectively, and control weight functions illustrated in FIG. 4 and FIG. 5 are created by multiplying the weight functions by weight gains $W_b$, $W_s$. FIG. 4 is a view illustrating a weight function to the sprung G after gain adjustment and illustrates a weight function obtained by multiplying the weight function illustrated in FIG. 2 by the weight gain $W_b$ of the sprung vibration control. FIG. 5 is a view illustrating a weight function to the vertical load variation after gain adjustment and illustrates a weight function obtained by multiplying the weight function illustrated in FIG. 3 by the weight gain $W_s$ of the vertical load variation control. The weight gain $W_b$ of the sprung vibration control is set to, for example, 0.3, and the weight gain $W_s$ of the vertical load variation control is set to, for example, 0.2.

As described above, a large weight is given to the sprung vibration as to the vibration of a relatively low frequency and a large weight is given to the vertical load variation as to the vibration of a relative high frequency according to the vibration characteristics of the sprung member 10 and the vibration characteristics of the unsprung member 20. With the operation, when a low frequency vibration, for example, a vibration corresponding to the resonance frequency of the sprung member 10 is generated to the vehicle, the spring mechanism 30A and the damping mechanism 30B are controlled so as to give priority to a suppression of the sprung vibration. In the embodiment, the variable spring force is calculated based on the control logic paying attention to a low frequency response of the sprung vibration characteristics. In a low frequency region including the resonance frequency of the sprung member 10, the spring coefficient of the spring mechanism 30A is controlled to thereby suppress a low frequency response of the sprung member 10. For example, the low frequency vibration is damped by increasing the spring force. With the operation, the feeling while riding is improved.

Further, when a high frequency vibration, for example, a vibration corresponding to the resonance frequency of the unsprung member 20 is generated to the vehicle, the spring mechanism 30A and the damping mechanism 30B are controlled so as to give priority to a suppression of the vertical load variation. In the embodiment, the variable damping force is calculated based on the control logic paying attention to the high frequency response of the unsprung vertical load variation amount. In a high frequency region including the resonance frequency of the unsprung member 20, the damping coefficient of the damping mechanism 30B is controlled to thereby suppress a high frequency response of the vertical load variation amount. For example, a high frequency vertical load variation is damped by increasing the damping force. With the operation, the road-holding property is improved. As described above, in the vibration damping control of the embodiment, the spring mechanism 30A and the damping mechanism 30B are controlled based on the frequency of the sprung vibration and the frequency of the unsprung vibration.

According to the vehicle control device 1-1 of the embodiment, an improvement of the feeling while riding and an improvement of the road-holding property can be achieved at the same time. Conventionally, to suppress the sprung vibration, although a damping force of a damping mechanism may be controlled setting a target for reducing the sprung vibration, in the case, the unsprung vertical load variation may become large. This is because a sprung isolating force as a suspension generating force acts as a force for exciting an unsprung at the same time. That is, since a sprung vibration isolation and an unsprung excitation coexist, it becomes difficult to suppress the vertical load variation. As a result, a deterioration of the road-holding property may be felt on a good road and tramping may be felt on a bad road.

The vehicle control device 1-1 of the embodiment can generate a suppression force to the sprung vibration mainly to the spring mechanism 30A and a suppression force to the unsprung vertical load variation mainly to the damping mechanism 30B, respectively. With the operation, the sprung vibration and the vertical load variation can be suppressed at the same time. Even when, for example, the vehicle travels on a road surface, from which a road surface displacement that generates a vibration of a sprung resonance and a vibration of an unsprung resonance at the same time is input as a road surface displacement speed as a disturbance input, the sprung vibration and the vertical load variation are suppressed at the same time. According to the vehicle control device 1-1 of the embodiment, the improvement of the feeling while riding and the improvement of the road-holding property can be achieved at the same time on the bad road where the sprung vibration and the vertical load variation are likely to be generated.

Note that, although the parameter values such as the cut-off frequency of the filter and the weight gains $W_b$, $W_s$ are previously determined based on the vibration characteristics of the vehicle, and the like so that the improvement of the feeling while riding and the improvement of the road-holding property are achieved at the same time at a maximum, the parameter values may be made variable according to a travel environment and the like. In, for example, a travel environment in which the improvement of the road-holding property is desired, for example, in a travel environment in which a road surface μ is lowered at the time of rain, road surface freezing, and the like, it is preferable to execute the vibration damping control putting more emphasis on the road-holding property. Further, the parameter values may be different according to a driver's travel intention. When, for example, a driver intends to execute a smart sport travel, a parameter value that sets priority on the improvement of the road-holding property may be used. Further, at the time of acceleration and braking, a parameter value different from that at the time of steady travel, for example, a parameter value that sets priority on the improvement of the road-holding property may be used.

The parameter values may be made variable according to a travel state and the like. For example, at least any one of the weight gain $W_b$ of the sprung vibration control or the weight gain $W_s$ of the vertical load variation control may be made variable according a vehicle speed V. As an example, at least any one of the weight gain $W_b$ of the sprung vibration control or the weight gain $W_s$ of the vertical load variation control may be increased according to an increase of the vehicle speed V. For example, there is a method of changing threshold values in the measured values of the sprung G and the vertical load variation amount depending on speed. When the threshold values are increased by the increase of the speed, the weight gain $W_b$ of the sprung vibration control and the weight gain $W_s$ of the vertical load variation control may be increased.

Figure 6:
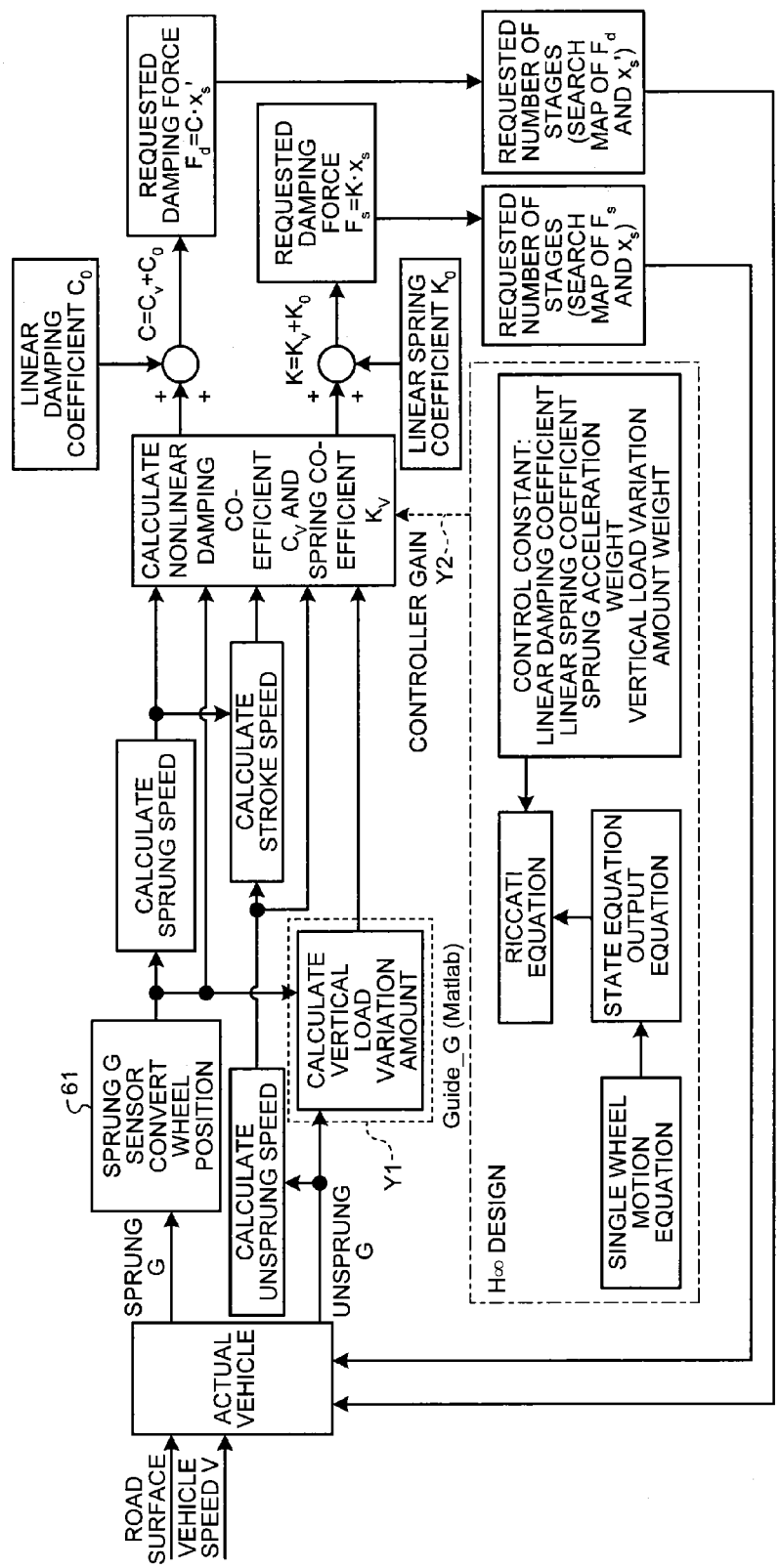
FIG. 6 is a block diagram illustrating a configuration of control executed by a vehicle control device of the embodiment.
Figure 7:
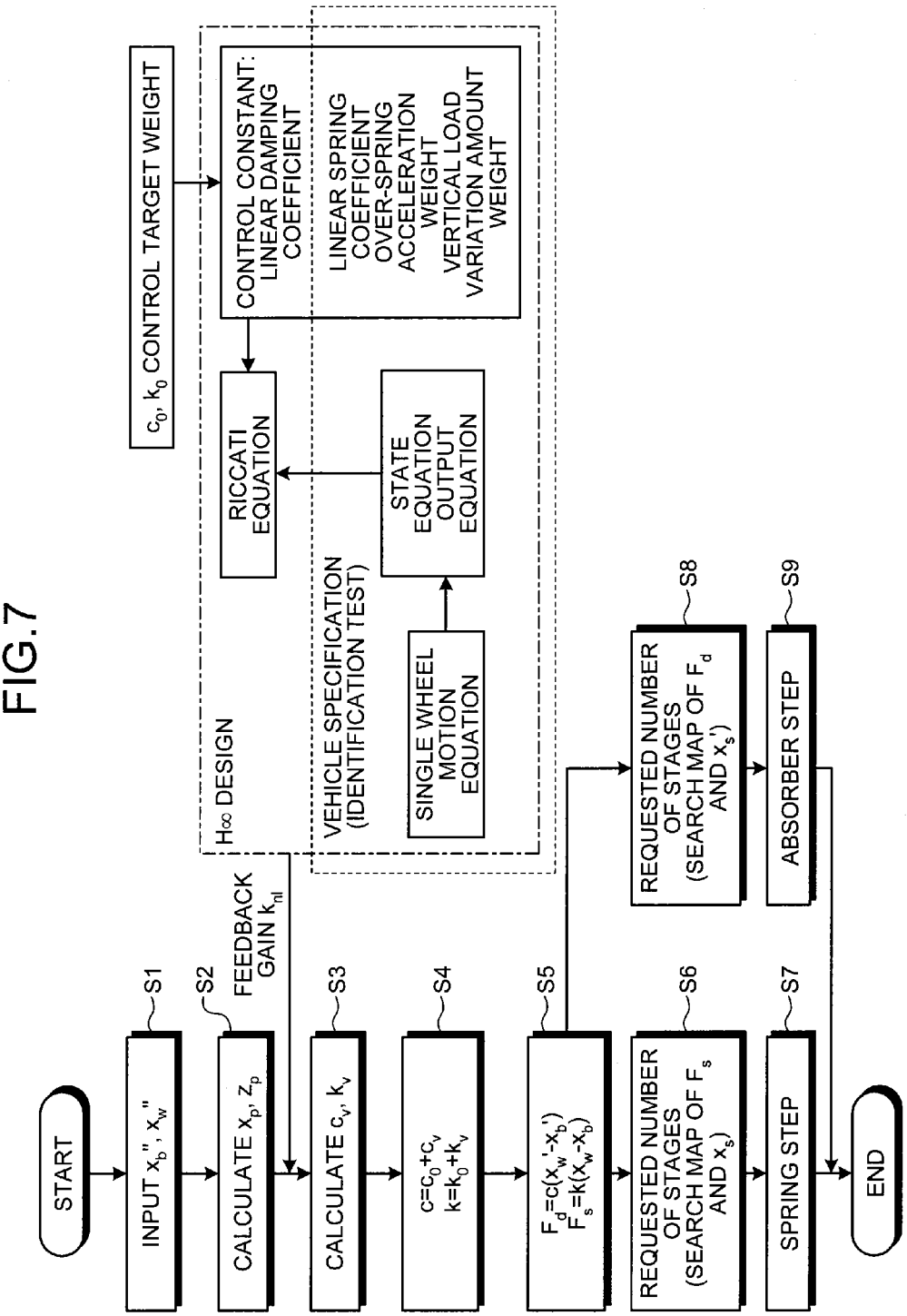
FIG. 7 is a flowchart illustrating a flow of the control executed by the vehicle control device.

FIG. 6 is a block diagram illustrating a configuration of control in the vehicle control device 1-1 of the embodiment, and FIG. 7 is a flowchart illustrating a control flow by the vehicle control device 1-1. As illustrated in FIG. 6, the actual vehicle (vehicle) travelling at the vehicle speed V has an input (road surface displacement) from a road surface. Further, the sprung G of the vehicle is detected by the sprung G sensor 61 and converted to acceleration at a predetermined position (for example, wheel position). The vibration damping control of the embodiment is executed based on the sprung G and the unsprung G detected by the unsprung G sensor 62 as explained referring to FIG. 6 and FIG. 7.

First, at step S1, the ECU 60 is input with the sprung acceleration $x_b''$ and the unsprung acceleration $x_w''$. The ECU 60 obtains the sprung acceleration $x_b''$ from the sprung G sensor 61 and obtains the unsprung G sensor 62 from the unsprung acceleration $x_w''$, respectively.

Next, at step S2, a state amount $x_p$ and an evaluation output $z_p$ are calculated by the ECU 60. First, a method of calculating the state amount $x_p$ will be explained. The ECU 60 calculates a relative displacement amount $(x_r - x_w)$ between the unsprung member 20 and the road surface 50 based on the vertical load variation amount $F_r$. Specifically, from Expression (5), the relative displacement amount $(x_r - x_w)$ between the unsprung member 20 and the road surface 50 is shown by Expression (12) described below.

$$(x_r - x_w) = (m_b x_b'' + m_w x_w'')/k_t \qquad (12)$$

The ECU 60 can calculate the relative displacement amount $(x_r - x_w)$ between the unsprung member 20 and the road surface 50 from Expression (12).

Further, the ECU 60 calculates a sprung speed $x_b'$ and a sprung displacement $x_b$ by integrating the sprung acceleration $x_b''$ obtained from the sprung G sensor 61 and calculates an unsprung speed $x_w'$ and an unsprung displacement $x_w$ by integrating the unsprung acceleration $x_w''$ obtained from the unsprung G sensor 62. With the operation, the relative displacement $(x_w - x_b)$ between the sprung member 10 and the unsprung member 20 in the state amount $x_p$, the unsprung speed $x_w'$, and the sprung speed $x_b'$ are determined, respectively.

Further, the evaluation output $z_p$ can be calculated based on the sprung acceleration $x_b''$ obtained from the sprung G sensor 61 and the unsprung acceleration $x_w''$ obtained from the unsprung G sensor 62. The sprung acceleration $x_b''$ that is an element of a first line of the evaluation output $z_p$ is a first physical quantity relating to the sprung vibration of the vehicle. The vertical load variation amount that is an element of a second line of the evaluation output $z_p$ is a second physical quantity relating to the unsprung vibration of the vehicle. The vertical load variation amount can be calculated based on the sprung acceleration $x_b''$ and the unsprung acceleration $x_w''$ and the previously stored sprung mass $m_b$ and an unsprung mass $m_w$ (refer to a symbol Y1 of FIG. 6). When step S2 is executed, a process goes to step S3.

At step S3, the nonlinear damping coefficient $c_v$ and the nonlinear spring coefficient $k_v$ are calculated by the ECU 60. The nonlinear damping coefficient $c_v$ and the nonlinear spring coefficient $k_v$ are calculated by [Expression 25] described below based on the state amount $x_p$ and the evaluation output $z_p$ calculated at step S2 and on a feedback gain (controller gain) $k_{nl}$ determined by the H∞ control theory. The determination of the feedback gain $k_{nl}$ by the H∞ control theory is executed by, for example, the ECU 60.

The ECU 60 obtains the linear damping coefficient $c_0$, the linear spring coefficient $k_0$, and control target weight that are previously determined by an adaptation test and determines the linear damping coefficient $c_0$, the linear spring coefficient $k_0$, a sprung acceleration weight, and a vertical load variation amount weight as control constants. Further, the ECU 60 previously stores Expression (1) and Expression (2) that are a single wheel motion equation based on vehicle specifications determined by an identification test, and a state equation, an output equation, and the like. The ECU 60 determines the feedback gain $k_{nl}$ by solving the Riccati equation based on the sprung acceleration $x_b''$ and the vertical load variation amount $F_t$ obtained based on a result of detection (refer to a symbol Y2 of FIG. 6). The ECU 60 calculates the nonlinear damping coefficient $c_v$ and the nonlinear spring coefficient $k_v$ based on the thus determined feedback gain $k_{nl}$.

$$u = \begin{pmatrix} c_v \\ k_v \end{pmatrix} = -k_{nl}\begin{pmatrix} x_p \\ z_p \end{pmatrix} \quad \text{[Expression 25]}$$

Note that, at step S3, the ECU 60 may determine the feedback gain $k_{nl}$ based on the correspondence relation between a combination of the previously stored respective inputs and the feedback gain $k_{nl}$ in place of solving the Riccati equation. That is, it is also possible to previously store the feedback gain $k_{nl}$ that is determined from a combination of the linear damping coefficient $c_0$, the linear spring coefficient $k_0$, the sprung acceleration weight, the vertical load variation amount weight, the sprung acceleration $x_b''$, and the vertical load variation amount $F_t$ as the inputs and to calculate the nonlinear damping coefficient $c_v$ and the nonlinear spring coefficient $k_v$ from the value of the stored feedback gain $k_{nl}$.

Next, at step S4, target values of the damping coefficient c and the spring coefficient k are determined by the ECU 60. The target value of the damping coefficient c is a sum of the linear damping coefficient $c_0$ and the nonlinear damping coefficient $c_v$ calculated at step S3. Further, the target value of the spring coefficient k is a sum of the linear spring coefficient $k_0$ and the nonlinear spring coefficient $k_v$ calculated at step S3.

Next, at step S5, a target value of the damping force $F_d$ and a target value of the spring force $F_s$ are calculated by the ECU 60, respectively. The target value of the damping force $F_d$ is calculated by Expression (13) described below based on the sprung speed $x_b'$ and the unsprung speed $x_w'$ calculated at step S1 and the target value of the damping coefficient c calculated at step S4.

$$F_d = c(x_w' - x_b') \quad (13)$$

Further, the target value of the spring force $F_s$ is calculated by Expression (14) based on the sprung displacement $x_b$ and the unsprung displacement $x_w$ calculated at step S1 and the target value of the spring coefficient k calculated at step S4.

$$F_s = k(x_w - x_b) \quad (14)$$

When step S5 is executed, the ECU 60 executes a control of the spring mechanism 30A at steps S6 and S7 and a control of the damping mechanism 30B at steps S8 and S9. In the embodiment, although the control of the spring mechanism 30A and the control of the damping mechanism 30B are executed in parallel, the control of the spring mechanism 30A and the control of the damping mechanism 30B may be executed in a predetermined order in place of being executed in parallel.

At step S6, the requested number of stages of the spring mechanism 30A is determined by the ECU 60. In the spring mechanism 30A, the spring coefficient k can be switched to plural different stages. Switching of the number of stages can be realized by switching the flow path area of the air pipe stepwise by, for example, an actuator. The ECU 60 previously stores a map showing a correspondence relation between an expansion/contraction amount $x_s$ of the suspension device 30, that is, the relative displacement amount $(x_w - x_b)$ between the sprung member 10 and the unsprung member 20 and the spring force generated by the spring mechanism 30A at the number of respective stages. The ECU 60 calculates the requested number of stages of the spring mechanism 30A based on the map and the target value of the spring force $F_s$ calculated at step S5.

Next, at step S7, the spring mechanism 30A is controlled by the ECU 60 as a spring step. The ECU 60 controls the actuator of the spring mechanism 30A to realize the requested number of stages determined at step S6. When step S7 is executed, the control flow is finished.

In contrast, at step S8, the requested number of stages of the damping mechanism 30B is determined by the ECU 60. In the damping mechanism 30B, the damping coefficient c can be switched to plural different stages. Switching of the number of stages can be realized by switching the area of the oil path communicating the piston upper chamber with the piston lower chamber stepwise by, for example, the actuator of the damping mechanism 30B. The ECU 60 previously stores a map showing a correspondence relation between an expansion/contraction speed $x_s'$ of the suspension device 30, that is, a relative speed $(x_w' - x_b')$ between the sprung member 10 and the unsprung member 20 and the damping force $F_d$ that is generated the damping mechanism 30B at the number of respective stages. The ECU 60 calculates the requested number of stages of the damping mechanism 30B based on the map and the target value of the damping force $F_d$ calculated at step S5.

Next, at step S9, the damping mechanism 30B is controlled by the ECU 60 as an absorber step. The ECU 60 controls the actuator of the damping mechanism 30B to realize the requested number of stages determined at step S8. When step S9 is executed, the control flow is finished.

Figure 8:
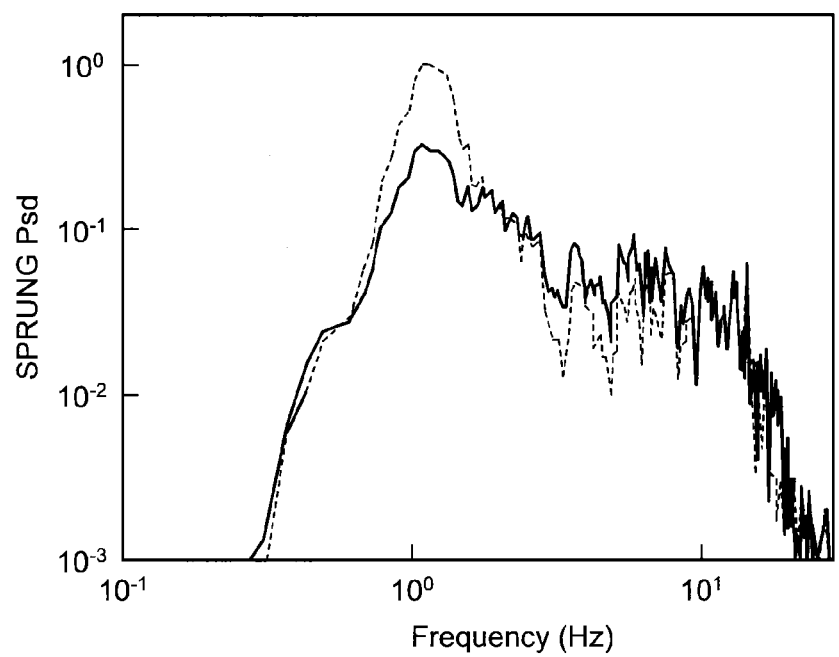
FIG. 8 is a view illustrating a sprung vibration when vibration damping control of the embodiment is executed.
Figure 9:
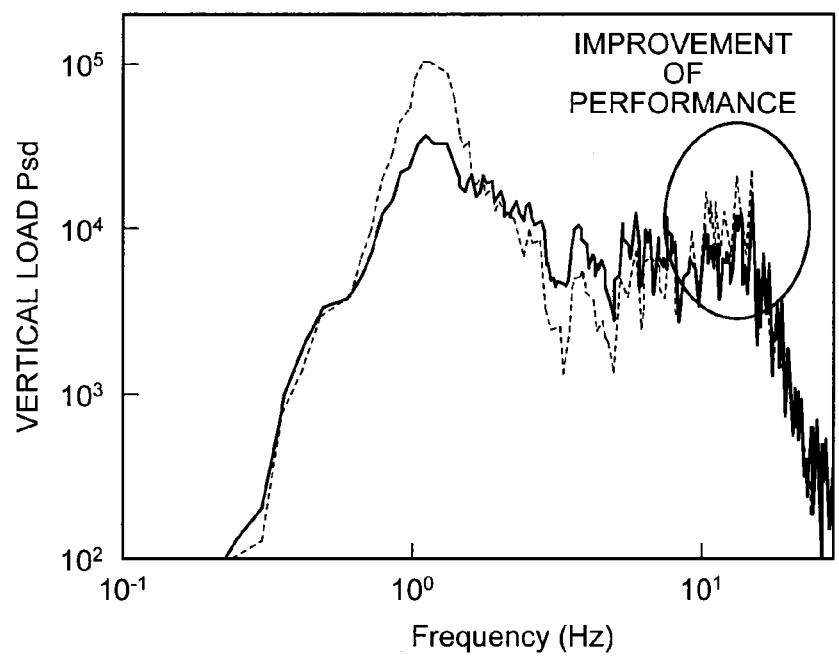
FIG. 9 is a view illustrating a vertical load variation amount when the vibration damping control of the embodiment is executed.
Figure 11:
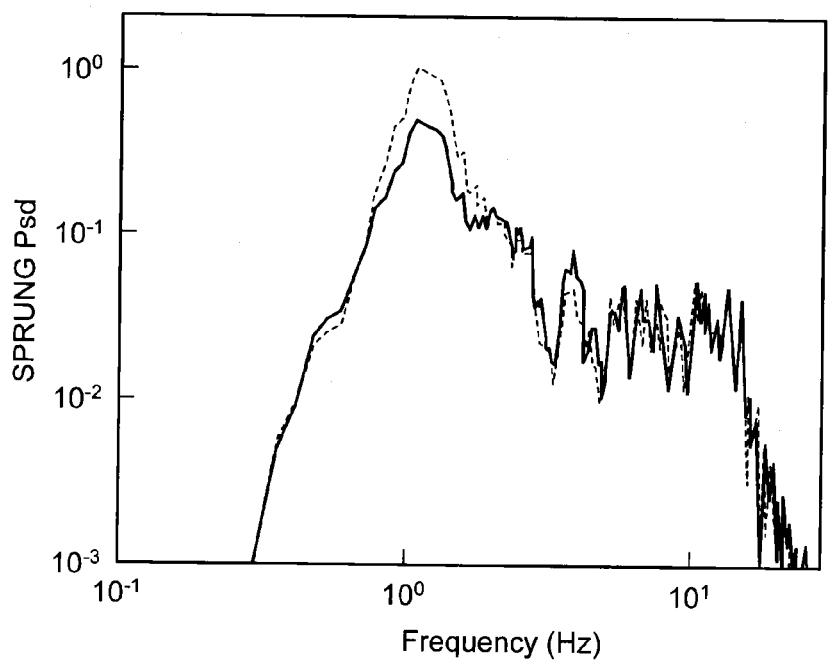
FIG. 11 is a view illustrating an example of the sprung vibration when a damping force of a damping mechanism is controlled aiming to reduce the sprung vibration.
Figure 12:
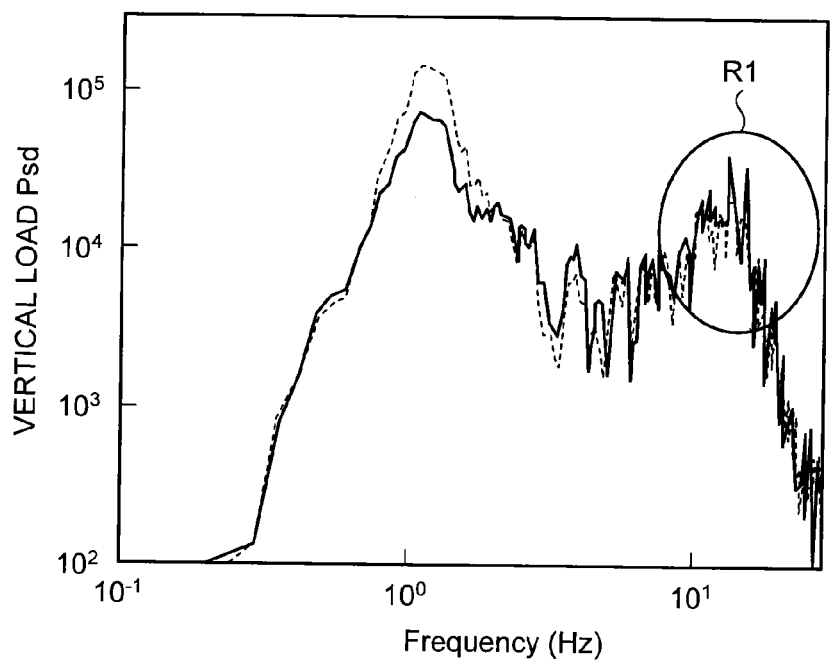
FIG. 12 is a view illustrating an example of the vertical load variation amount when the damping force of the damping mechanism is controlled aiming to reduce the sprung vibration.

Next, a result of simulation of a vibration isolation effect by the vibration damping control of the embodiment will be explained. FIG. 8 is a view illustrating the sprung vibration when the vibration damping control of the embodiment is executed, and FIG. 9 is a view illustrating the vertical load variation amount when the vibration damping control of the embodiment is executed. Further, FIG. 11 is a view illustrating an example of the sprung vibration when the damping force of the damping mechanism is controlled aiming to reduce the sprung vibration, and FIG. 12 is a view illustrating an example of the vertical load variation amount when the damping force of the damping mechanism is controlled aiming to reduce the sprung vibration. FIG. 11 and FIG. 12 illustrate the sprung vibration and the vertical load variation amount when the spring coefficient is not variably controlled as well as the vertical load variation amount is not taken into consideration in the control of the damping coefficient different from the vibration damping control of the embodiment, respectively.

In FIG. 8, FIG. 9, FIG. 11, and FIG. 12, a horizontal axis illustrates a frequency, and a vertical axis illustrates a power spectrum density, respectively. Further, in FIG. 8, FIG. 9, FIG. 11, and FIG. 12, a broken line illustrates a value when the suspension device is not controlled and a solid line illustrates a value when the suspension device is controlled, respectively. As illustrated in FIG. 11, when the control is executed (solid line) by controlling the damping force for the purpose of reducing the sprung vibration, the sprung vibration is reduced in comparison with a case that the control is not executed (broken line). However, as illustrated by a symbol R1 in FIG. 12, the vertical load variation amount when the control is executed is increased than the vertical load variation amount when the control is not executed.

In contrast, according to the vehicle control device 1-1 of the embodiment, not only the sprung vibration is suppressed as illustrated in FIG. 8 but also the unsprung vertical load variation amount is suppressed as illustrated in FIG. 9. As illustrated in FIG. 8 and FIG. 9, the sprung vibration and the vertical load variation amount are reduced, respectively in a frequency band of about 1 Hz as compared with the case that the control is not executed. Further, as illustrated in FIG. 9, the vertical load variation amount is reduced in a frequency band of about 10 Hz as compared with the case that the control is not executed.

As described above, according to the vehicle control device 1-1 of the embodiment, the spring mechanism 30A and the damping mechanism 30B are controlled in cooperation according to a vibration generated to the vehicle. The sprung vibration and the vertical load variation amount are reduced, respectively, by controlling the spring mechanism 30A and the damping mechanism 30B in cooperation based on the sprung acceleration $x_b''$ that is the first physical quantity relating to the sprung vibration and on the vertical load variation amount $F_t$ that the second physical quantity relating to the unsprung vibration. Accordingly, the vehicle control device 1-1 of the embodiment can realize the feeling while riding and the road-holding property at the same time at a maximum.

Here, there is a possibility that a vibration is increased by the vibration damping control executed by the vehicle control device 1-1 in a frequency band excluding a frequency band of the sprung resonance and in a frequency band of the unsprung resonance. For example, there is a possibility that the sprung vibration and the vertical load variation amount are increased in an intermediate frequency region of 2 to 8 Hz that is a frequency band between the frequency band of the sprung resonance and the frequency band of the unsprung resonance in comparison with a case that the control is not executed. It is preferable to make a design so that an increase of vibration in the other frequency band can be suppressed in a control logic of the vibration damping control.

Note that the motion equation, the state equation, the output equation, and the like disclosed in the embodiment are only an example and are not limited thereto. Further, in the embodiment, although the target value of the spring force and the target value of the damping force are determined by the H∞ control theory, the method for determining the respective target values are not limited thereto. The target value of the spring force and the target value of the damping force may be calculated by other control theory.

In the embodiment, although the first physical quantity relating to the sprung vibration is the sprung acceleration and the second physical quantity relating to the unsprung vibration is the vertical load variation amount, the sprung acceleration and the vertical load variation amount are not limited thereto. Other physical quantities may be employed as the first physical quantity and the second physical quantity.

Figure 10:
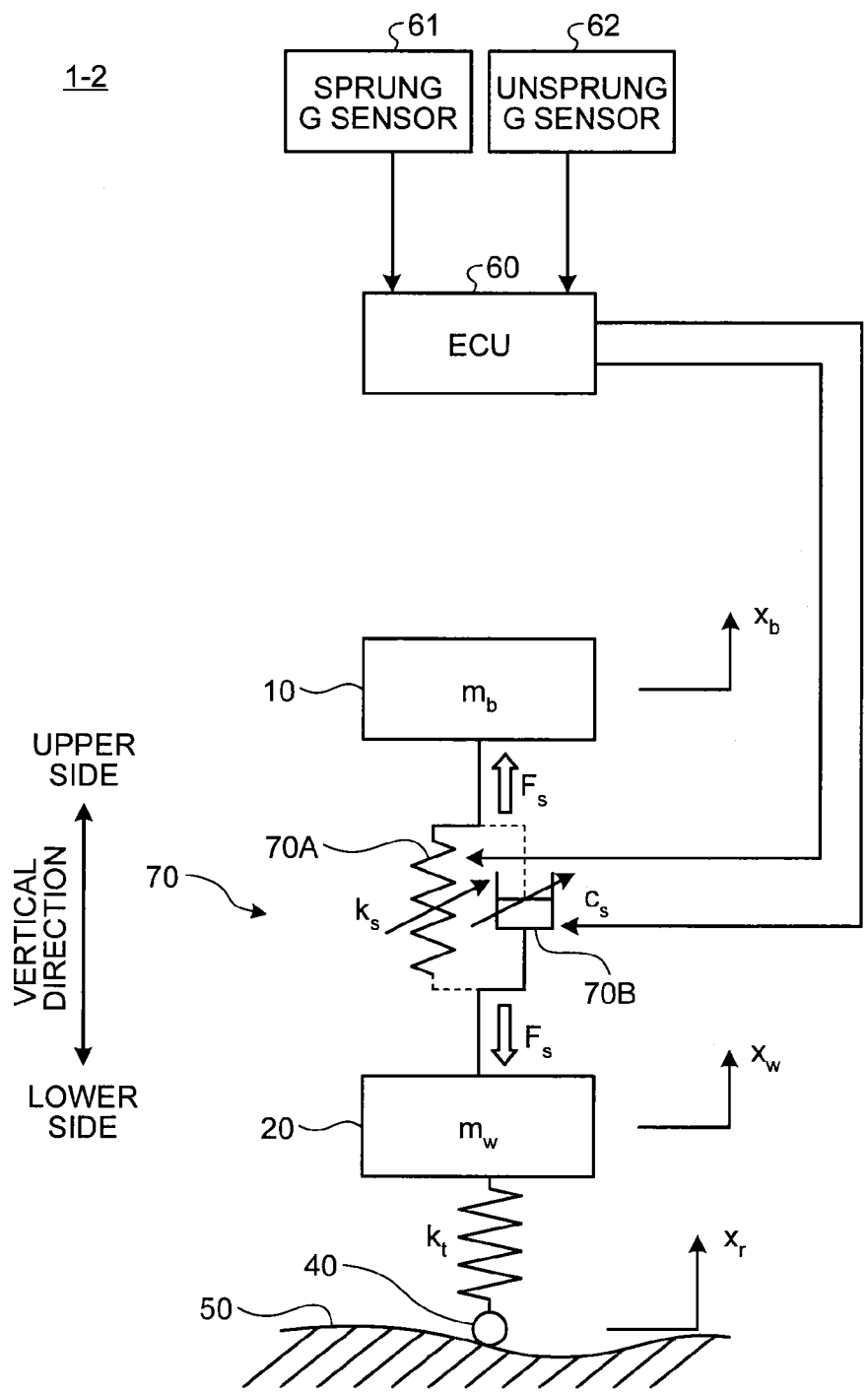
FIG. 10 is a view illustrating other example of the single wheel model of the vibration damping control system.

Further, the vibration damping control system is not limited to that illustrated in FIG. 1. For example, the suspension device may not be provided with the linear damping coefficient and the linear spring coefficient as illustrated in FIG. 10. FIG. 10 is a view illustrating other example as to the single wheel model of the vibration damping control system.

In a second vehicle control device 1-2 illustrated in FIG. 10, a second suspension device 70 has a second spring mechanism 70A whose spring coefficient $k_s$ is determined only by a nonlinear spring coefficient and a second damping mechanism 70B whose damping coefficient $c_s$ is determined only by a nonlinear damping coefficient. In the vehicle control device 1-2 having the suspension device 70, motion equations are shown by Expression (15) and Expression (16) described below.

$$m_b x_b'' = k_s(x_w - x_b) + c_s(x_w' - x_b') \qquad (15)$$

$$m_w x_w'' = -k_s(x_w - x_b) - c_s(x_w' - x_b') + k_t(x_r - x_w) \qquad (16)$$

That is, it is sufficient to determine the motion equations by omitting the linear spring coefficient and the linear damping coefficient in the motion equation based on the single wheel model illustrated in FIG. 1. Target values of the spring coefficient $k_s$ and the damping coefficient $c_s$ can be determined from the motion equations (15), (16) based on the H∞ control theory.

In the embodiment, although the spring coefficient and the damping coefficient are determined by the H∞ control logic, the spring coefficient and the damping coefficient may be directly determined based on the sprung vibration and the vertical load variation amount in place thereof. When, for example, a low frequency vibration is input to the vehicle, a sprung low frequency response (sprung resonance frequency region) is suppressed by increasing the spring force. At the time, the damping force is set small (for example, 0). In contrast, when a high frequency vibration is input to the vehicle, a high frequency response (unsprung resonance frequency region) of the vertical load variation amount is suppressed by increasing the damping force. At the time, the spring force is set small (for example, 0). The improvement of the feeling while riding and the improvement of the road-holding property can be achieved at the same time by appropriately determining the spring coefficient and the damping coefficient based on a frequency of an input vibration as described above. A correspondence relation between the frequency of the input vibration, and the spring coefficient and the damping coefficient can be previously determined based on, for example, a result of experiment and the like.

Note that a combination of a frequency and a generated force is not limited to that described above. For example, when a low frequency vibration is input, the damping force may be increased as well as the spring force may be reduced, whereas when a high frequency vibration is input, the spring force may be increased as well as the damping force may be reduced. That is, it is sufficient to control the spring mechanism 30A and the damping mechanism 30B based on the vibration characteristics of the sprung member 10 and on the vibration characteristics of the unsprung member 20, that is, to control the spring mechanism 30A based on the sprung vibration characteristics and to control the damping mechanism 30B based on the unsprung vibration characteristics.

The contents disclosed in the embodiment can be executed by being appropriately combined.

INDUSTRIAL APPLICABILITY

As described above, the vehicle control device according to the present invention is useful to suppress a vibration of the vehicle and suitable for suppressing a vibration of the sprung member and a vibration of the unsprung member at the same time.

REFERENCE SIGNS LIST

1-1 vehicle control device
1-2 vehicle control device
10 sprung member
20 unsprung member
30 suspension device
30A spring mechanism
30B damping mechanism
40 wheel
50 road surface
60 ECU
61 sprung G sensor
62 unsprung G sensor
70 suspension device
70A spring mechanism
70B damping mechanism
c damping coefficient
$c_s$ damping corfficient
$c_0$ linear damping coefficient
$c_v$ nonlinear damping coefficient
$F_0$ generation force (without control)
$F_v$ generation force (with control)
$F_s$ spring force
$F_d$ damping force
$F_t$ vertical load variation amount (second physical quantity)
k spring coefficient
$k_0$ linear spring coefficient
$k_v$ nonlinear spring coefficient
$k_t$ wheel spring constant
$k_{nl}$ feedback gain
$k_s$ spring coefficient
$m_b$ sprung mass
$m_w$ unsprung mass
$x_r$ displacement of a road surface
$x_s$ expansion/contraction amount
$x_s'$ expansion/contraction speed
$x_b$ sprung displacement
$x_w$ unsprung displacement
$x_b'$ sprung speed
$x_w'$ unsprung speed
$x_b''$ sprung acceleration (first physical quantity)
$x_w''$ unsprung acceleration
$x_p$ state amount
$z_p$ evaluation output
$W_b$ weight gain of sprung vibration control
$W_s$ weight gain of vertical load variation control
R1 symbol showing the increase in the vertical load variation amount when the control is executed compared to the vertical load variation amount when the control is not executed

The invention claimed is:

1. A vehicle control device comprising:
a spring mechanism configured to connect a sprung member and an unsprung member of a vehicle, and generate a spring force according to a relative displacement between the sprung member and the unsprung member, the spring mechanism having a spring coefficient that is a variable spring coefficient for variably controlling the spring force;
a damping mechanism configured to connect the sprung member and the unsprung member, and generate a damping force for damping a relative motion between the sprung member and the unsprung member, the damping mechanism having a damping coefficient that is a variable damping coefficient for variably controlling the damping force; and
a controller, wherein
the spring mechanism and the damping mechanism are disposed in parallel,
the spring mechanism and the damping mechanism are controlled based on a first physical quantity relating to a sprung vibration of the vehicle and a second physical quantity relating to an unsprung vibration of the vehicle,
the controller performs a control logic for controlling the spring mechanism and the damping mechanism such that when low frequency vibration corresponding to a resonance frequency of the sprung member is caused on the vehicle, the controller prioritizes a suppression of vibration of the sprung member, and when high frequency vibration corresponding to a resonance frequency of the unsprung member is caused on the vehicle, the controller prioritizes a suppression of vibration of the unsprung member,
the control logic includes a first frequency weight function used to calculate a target value of the spring coefficient for controlling the spring force, and a second frequency weight function used to calculate a target value of the damping coefficient for controlling the damping force,
a weight gain of the first frequency weight function is maximized at the resonance frequency of the sprung member, the weight gain of the first frequency weight function is reduced as the frequency of the sprung vibration decreases in a first region in which the frequency of the sprung vibration is lower than the resonance frequency of the sprung member and is higher than a predetermined value which is lower than the resonance frequency of the sprung member, and the weight gain of the first frequency weight function is constant in a second region in which the frequency of the sprung vibration is equal to or less than the predetermined value, a weight gain of the second frequency weight function is maximized at the resonance frequency of the unsprung member, the controller calculates, at the time a road surface displacement that generates the low frequency vibration and the high frequency vibration at the same time is input to the vehicle, the target value of the spring coefficient and the target value of the damping coefficient using the first frequency weight function and the second frequency weight function, respectively, and controls both of the spring mechanism and the damping mechanism at the same time to generate a spring force according to the calculated target of the spring coefficient and a damping force according to the calculated target value of the damping coefficient, and an increase in the weight gain of the first frequency weight function increases the spring coefficient of the spring mechanism, and an increase in the weight gain of the second frequency weight function increases the damping coefficient of the damping mechanism.

2. The vehicle control device according to claim 1, wherein the spring mechanism and the damping mechanism are controlled based on a frequency of the sprung vibration and a frequency of the unsprung vibration.

3. The vehicle control device according to claim 1, wherein the second physical quantity is a vertical load variation amount of a wheel of the vehicle, and the vertical load variation amount is calculated based on a sprung acceleration and an unsprung acceleration of the vehicle.

4. The vehicle control device according to claim 1, wherein the spring mechanism is controlled so as to suppress a low frequency vibration generated to the vehicle.

5. The vehicle control device according to claim 1, wherein the damping mechanism is controlled so as to suppress a high frequency vibration generated to the vehicle.

6. The vehicle control device according to claim 2, wherein the spring mechanism and the damping mechanism are controlled according to a spring mechanism frequency and a damping mechanism frequency, respectively, based on the first physical quantity and the second physical quantity.

7. The vehicle control device according to claim 6, wherein target values of the spring force and the damping force are determined by applying an H∞ control theory to a motion model of the vehicle including the spring mechanism and the damping mechanism.

8. The vehicle control device according to claim 7, wherein target values of the spring force and the damping force are determined using a displacement speed on a road surface in a vertical direction as a disturbance input to the motion model.

9. A vehicle control device comprising:

a spring mechanism configured to connect a sprung member and an unsprung member of a vehicle, and generate a spring force according to a relative displacement between the sprung member and the unsprung member, the spring mechanism having a spring coefficient that is a variable spring coefficient for variably controlling the spring force; and a damping mechanism configured to connect the sprung member and the unsprung member, and generate a damping force for damping a relative motion between the sprung member and the unsprung member, the damping mechanism having a damping coefficient that is a variable damping coefficient for variably controlling the damping force; and a controller, wherein the spring mechanism and the damping mechanism are disposed in parallel, the spring mechanism and the damping mechanism are controlled in cooperation based on a sprung vibration of the vehicle and an unsprung vibration of the vehicle, and one of the spring mechanism and the damping mechanism is controlled based on a vibration characteristic of the sprung member and the other of the spring mechanism and the damping mechanism is controlled based on vibration characteristics of the unsprung member, the controller performs a control logic for controlling the spring mechanism and the damping mechanism such that when low frequency vibration corresponding to a resonance frequency of the sprung member is caused on the vehicle, the controller prioritizes a suppression of vibration of the sprung member, and when high frequency vibration corresponding to a resonance frequency of the unsprung member is caused on the vehicle, the controller prioritizes a suppression of vibration of the unsprung member, the control logic includes a first frequency weight function used to calculate a target value of the spring coefficient for controlling the spring force and a second frequency weight function used to calculate a target value of the damping coefficient for controlling the damping force, a weight gain of the first frequency weight function is maximized at the resonance frequency of the sprung member, the weight gain of the first frequency weight function is reduced as the frequency of the sprung vibration decreases in a first region in which the frequency of the sprung vibration is lower than the resonance frequency of the sprung member and is higher than a predetermined value which is lower than the resonance frequency of the sprung member, and the weight gain of the first frequency weight function is constant in a second region in which the frequency of the sprung vibration is equal to or less than the predetermined value, a weight gain of the second frequency weight function is maximized at the resonance frequency of the unsprung member, the controller calculates, at the time a road surface displacement that generates the low frequency vibration and the high frequency vibration at the same time is input to the vehicle, the target value of the spring coefficient and the target value of the damping coefficient using the first frequency weight function and the second frequency weight function, respectively, and controls both of the spring mechanism and the damping mechanism at the same time to generate a spring force according to the calculated target value of the spring coefficient and a damping force according to the calculated target value of the damping coefficient, and an increase in the weight gain of the first frequency weight function increases the spring coefficient of the spring mechanism, and an increase in the weight gain of the second frequency weight function increases the damping coefficient of the damping mechanism.

10. A vehicle control device comprising:

a spring mechanism configured to connect a sprung member and an unsprung member of a vehicle, and generate a spring force according to a relative displacement between the sprung member and the unsprung member, the spring mechanism having a spring coefficient that is a variable spring coefficient for variably controlling the spring force; and a damping mechanism configured to connect the sprung member and the unsprung member, and generate a damping force for damping a relative motion between the sprung member and the unsprung member, the damping mechanism having a damping coefficient that is a variable damping coefficient for variably controlling the damping force; and a controller, wherein the spring mechanism and the damping mechanism are disposed in parallel, one of the spring mechanism and the damping mechanism is controlled based on a vibration characteristic of the sprung member and the other of the spring mechanism and the damping mechanism is controlled based on vibration characteristics of the unsprung member by applying an H∞ control theory to a motion model of the vehicle including the spring mechanism and the damping mechanism, the controller performs a control logic for controlling the spring mechanism and the damping mechanism such that when low frequency vibration corresponding to the resonance frequency of the sprung member is caused on the vehicle, the controller prioritizes a suppression of vibration of the sprung member, and when high frequency vibration corresponding to the resonance frequency of the unsprung member is caused on the vehicle, the controller prioritizes a suppression of vibration of the unsprung member, the control logic includes a first frequency weight function used to calculate a target value of the spring coefficient for controlling the spring force, and a second frequency weight function used to calculate a target value of the damping coefficient for controlling the damping force, a weight gain of the first frequency weight function is maximized at the resonance frequency of the sprung member, the weight gain of the first frequency weight function is reduced as the frequency of a sprung vibration decreases in a first region in which the frequency of the sprung vibration is lower than the resonance frequency of the sprung member and is higher than a predetermined value which is lower than the resonance frequency of the sprung member, and the weight gain of the first frequency weight function is constant in a second region in which the frequency of the sprung vibration is equal to or less than the predetermined value, a weight gain of the second frequency weight function is maximized at the resonance frequency of the unsprung member, the controller calculates, at the time a road surface displacement that generates the low frequency vibration and the high frequency vibration at the same time is input to the vehicle, the target value of the spring coefficient and the target value of the damping coefficient using the first frequency weight function and the second frequency weight function, respectively, and controls both of the spring mechanism and the damping mechanism at the same time to generate a spring force according to the calculated target value of the spring coefficient and a damping force according to the calculated target value of the damping coefficient, and an increase in the weight gain of the first frequency weight function increases the spring coefficient of the spring mechanism, and an increase in the weight gain of the second frequency weight function increases the damping coefficient of the damping mechanism.

11. The vehicle control device according to claim 1, wherein the weight gain of the second frequency weight function is increased at the time of rain or road surface freezing.

12. The vehicle control device according to claim 1, wherein the relatively low frequency vibration which is caused on the vehicle is less than or equal to 1 Hz, and the relatively high frequency vibration which is caused on the vehicle is greater than or equal to 10 Hz.

13. The vehicle control device according to claim 1, wherein the first frequency weight function is obtained by multiplying a first weight gain by a sprung acceleration based on a first Butterworth filter, the second frequency weight function is obtained by multiplying a second weight gain by a vertical load variation based on a second Butterworth filter, and at least one of the first and second weight gains is made variable in accordance with a vehicle speed, an increase in the first weight gain increases the spring coefficient of the spring mechanism, and an increase in the second weight gain increases the damping coefficient of the damping mechanism.

14. The vehicle control device according to claim 1, wherein the first frequency weight function is obtained by multiplying a first weight gain by a sprung acceleration based on a first Butterworth filter, the second frequency weight function is obtained by multiplying a second weight gain by a vertical load variation based on a second Butterworth filter, and at least one of the first and second weight gains is increased as a vehicle speed increases, an increase in the first weight gain increases the spring coefficient of the spring mechanism, and an increase in the second weight gain increases the damping coefficient of the damping mechanism.

* * * * *